United States Patent [19]

McMillan

[11] 4,157,042
[45] Jun. 5, 1979

[54] PULLEY DRIVE SYSTEM

[75] Inventor: Stephen L. McMillan, Louisville, Ky.

[73] Assignee: General Electric Company, Louisville, Ky.

[21] Appl. No.: 826,427

[22] Filed: Aug. 22, 1977

[51] Int. Cl.² ............................................ F16H 55/52
[52] U.S. Cl. ............................................ 74/230.17 E
[58] Field of Search ................. 74/230.17 E; 192/104; 68/27.3, 12 R

[56] References Cited

U.S. PATENT DOCUMENTS

| 3,159,257 | 12/1964 | Bochan | 192/104 |
|---|---|---|---|
| 3,324,984 | 6/1967 | Brame | 192/104 |
| 3,362,242 | 1/1968 | Watkins | 74/230.17 E |
| 3,659,470 | 5/1972 | Beaudoin | 74/230.17 E |
| 3,715,930 | 2/1973 | Beliveau et al. | 74/230.17 E |
| 3,771,378 | 11/1973 | Knobel | 74/230.17 E |
| 3,812,731 | 5/1974 | Sugimoto et al. | 74/230.17 E |
| 3,866,487 | 2/1975 | Key | 74/230.17 E |
| 3,978,693 | 9/1976 | Worst | 68/12 R |

FOREIGN PATENT DOCUMENTS 1073260  9/1954  France ........................... 74/230.17 E Primary Examiner—Samuel Scott
Assistant Examiner—William R. Henderson
Attorney, Agent, or Firm—Frederick P. Weidner; Bruce A. Yungman

[57] ABSTRACT

A pulley drive system including a centrifugally governed two speed drive pulley assembly and a driven pulley assembly coactively connected by a belt. There is a speed selection mechanism which includes an auxiliary weight movable from a radially inward position to a radially outward position which in one position prevents the centrifugally governed two speed drive assembly from shifting and the auxiliary weight operation is actuated by a pivotal trigger which in turn is actuated by a control member movable in response to a control mechanism.

6 Claims, 6 Drawing Figures

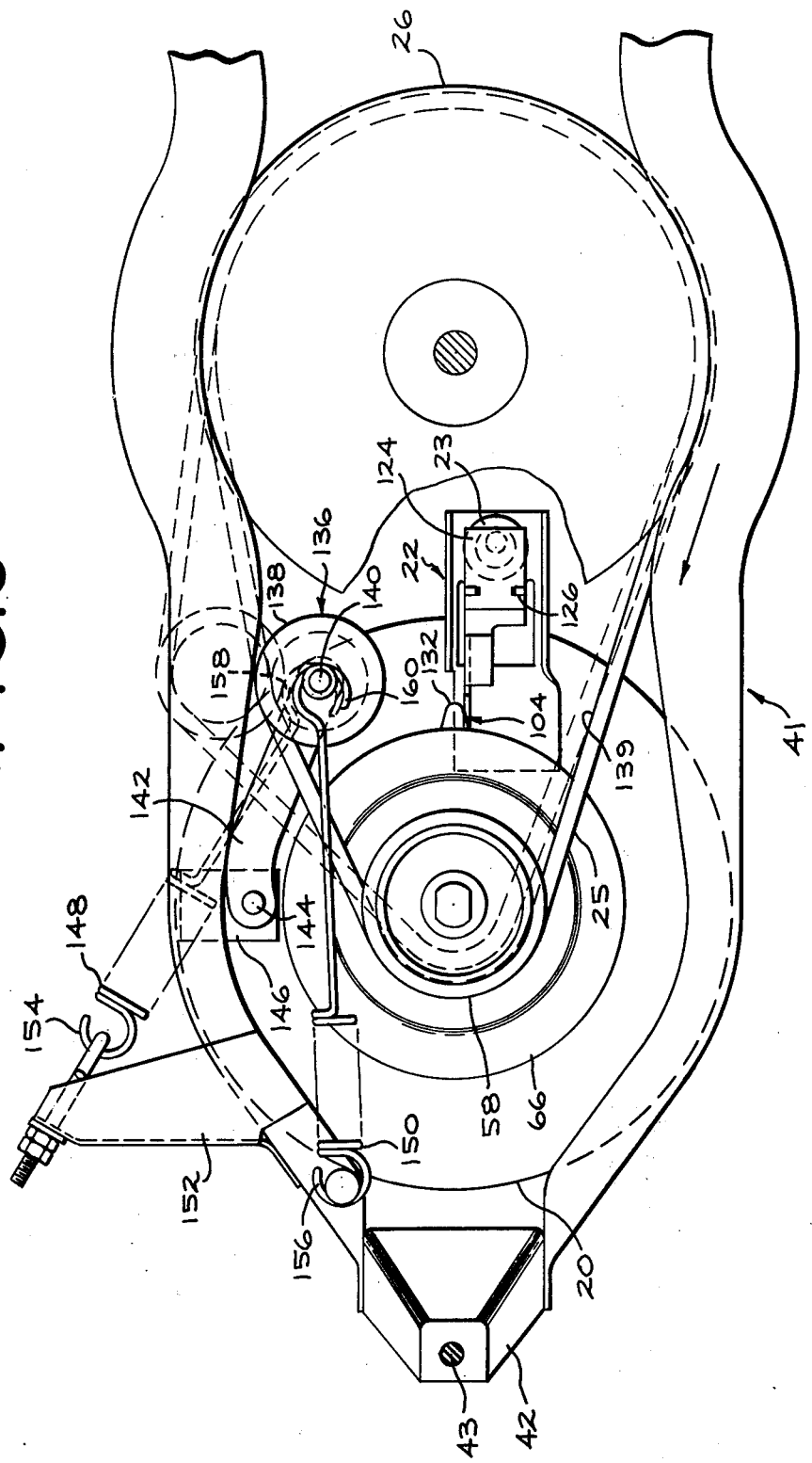

PULLEY DRIVE SYSTEM

BACKGROUND OF THE INVENTION

1. Field of the Invention:

The present invention relates to a pulley drive system which is centrifugally clutched and furthermore may act as a centrifugally governed two speed drive, the same centrifugal mechanism being utilized for both clutching and varying the pulley drive ratios.

2. Description of the Prior Art:

Variable speed pulley drive systems and centrifugally governed clutches for pulleys are well known in the prior art. For instance, U.S. Pat. Nos. 3,715,930; 3,771,378; 3,659,470; and 3,812,731 disclose such variable speed centrifugally operated drive pulleys.

It is known in the art to utilize a multiple-speed clutch which is centrifugally controlled, such as the clutch disclosed in U.S. Pat. No. 3,159,257 assigned to the same assignee as this invention. This type of clutch has been used to vary the driven speed of mechanisms for clothes washers. Trigger released auxiliary weights and a speed selection mechanism to actuate the trigger for controlling the different speeds of these clutches is disclosed in U.S. Pat. No. 3,324,984, assigned to the same assignee at this invention.

It is also known in the prior art to utilize a belt drive for operating the transmission of a clothes washing machine. An example of such a belt drive is disclosed in U.S. Pat. No. 3,978,693 assigned to the same assignee as the present invention. Automatic clothes washing machines have at least two modes of operation, a washing mode and a spin mode. During the washing mode the vertical center post vaned structure or agitator is oscillated by means of a motor driven belt drive mechanism through a transmission. During the spin mode the agitator and basket containing the clothes are spun in unison at high speed to extract liquid from the clothes within the basket. In many cases it is desirable to provide two speeds of operation in these respective modes. In some cases this is obtained in the prior art by having the belt driven through a mechanism by a two speed motor and in others a two speed clutch mechanism is utilized. Such arrangements, however, are not entirely satisfactory.

By my invention I have improved the prior art pulley drive systems to provide a means for clutching and obtaining a two speed drive system particularly useful in clothes washing machines which is simple in construction, of low cost, has good regulation, and provides torque conversion to reduce the amount of energy used in obtaining the lower speed.

SUMMARY OF THE INVENTION

There is provided a pulley drive system particularly useful in connection with automatic clothes washing machines. There is a drive member, a drive pulley assembly on the drive member having a first half pulley fixed to the drive member and a second half pulley rotatable with the drive member and axially movable on the drive member relative to the first half pulley. There is also provided a collar rotatable with the drive member and axially movable relative to the drive member and secured to the second half pulley with a base member also secured to the drive member and rotatable but not axially movable therewith. Between the collar and base member is a spring whose opposite ends bear on the collar and the base member, respectively. Flyweights are located between the second half pulley and the base member such that during rotation they exert centrifugal force on the second half pulley. There is a driven pulley assembly with a belt coactively connecting both the drive pulley assembly and the driven pulley assembly. An auxiliary weight is mounted on the base member for rotational movement therewith and movable by centrifugal force from a radially inward position to a radially outward position relative to the drive member, the radially inward position engages the collar and the radially outward position disengages the collar.

A speed selection mechanism is provided and includes a trigger mounted on the base member and rotatable therewith, the trigger being pivotable from a first position radially outward of the drive shaft and engaging the auxiliary weight to a second position disengaging the auxiliary weight. A control member movable between first and second positions and means for so moving the control member is arranged so that the control member in its first position is remote from the rotary path of the trigger and in its second position being in the rotary path of the trigger only when the trigger is in its first position to thereby pivot the trigger to its second position and allow the auxiliary weight to be disengaged from said collar. Upon such disengagement the drive pulley assembly operates to increase the diameter about which the driven belt travels thus providing for a second and faster belt speed.

BRIEF DESCRIPTION OF THE DRAWINGS

FIG. 6 is a plan view of the pulley drive system embodying my invention.

DESCRIPTION OF THE PREFERRED EMBODIMENT

Figure 1:
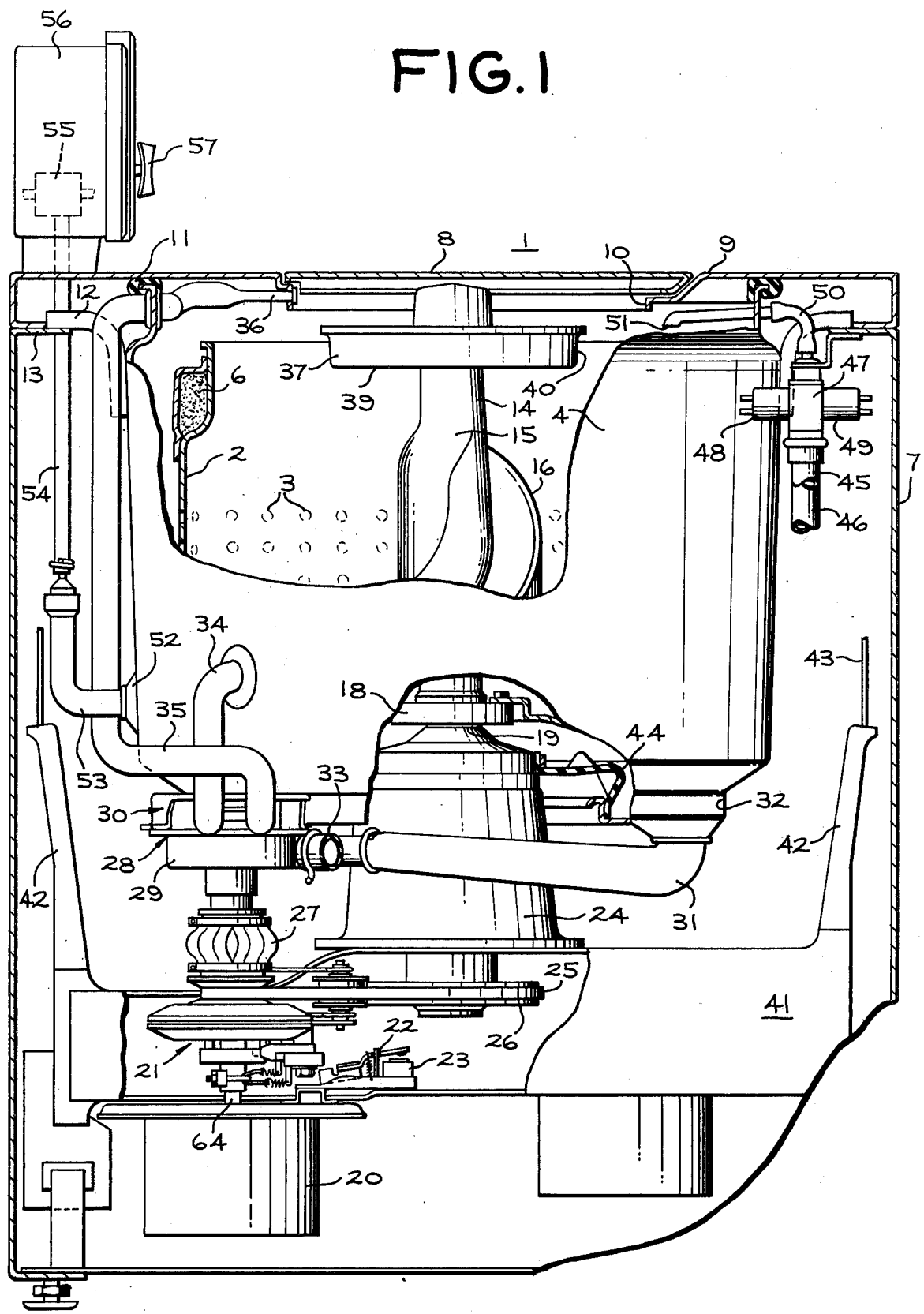
FIG. 1 is a side elevational view of a clothes washing machine which includes my invention, the view being partly broken away and partly in section to illustrate details.

Referring now to FIG. 1, I have shown therein an agitator-type clothes washing machine 1 having a conventional basket or clothes receiving receptacle 2 provided over its side and bottom walls with perforations 3 and disposed within an outer imperforate tub or casing 4 which serves as a liquid receptacle. The basket 2 may be provided with a balance ring 6 to help steady the basket when it is rotated at high speed.

Tub 4 is rigidly mounted within an appearance cabinet 7 which includes a cover 8 hingedly mounted in the top portion 9 of the cabinet for providing access to an opening 10 in the basket 2. As shown, a gasket 11 may be provided so as to form a seal between the top of the tub 4 and the portion 9 of the cabinet thereby to prevent escape of moisture and moist air into the cabinet around the tub. The rigid mounting of tub 4 within the cabinet 7 may be effected by any suitable means. As a typical example of one such means I have provided strap members 12, each of which is secured at one end to an inturned flange 13 of the cabinet and at its other end to the outside of tub 4.

At the center of basket 2 there is positioned a vertical axis agitator 14 which includes a centerpost 15 and a plurality of curved water circulating means 16. Both the clothes basket 2 and the agitator 14 are rotatably mounted. The basket is mounted on a flange 18 of a rotatable hub 19 and the agitator 14 is mounted on a shaft (not shown) which extends upwardly through the hub 19 and through the centerpost 15, and is secured to the agitator so as to drive it.

During a sequence of operations of machine 1, water is introduced into tub 4 and basket 2, agitator 14 is then oscillated back and forth on its axis, that is, in a horizontal plane within the basket, to wash the clothes therein. Then, after this washing step or period is completed, basket 2 and agitator 14 are rotated at high speed in unison to extract centrifugally washing liquid from the clothes and discharge it to drain. Following this extraction operation a supply of clean liquid is introduced into the basket for rinsing the clothes and the agitator is again oscillated. Finally, the basket and agitator are once more rotated at high speed to extract the rinse water. Basket 2 and agitator 14 may be driven through any suitable means. By way of example, I have shown them as driven from a reversible motor 20 through a system including a two speed centrifugal drive pulley assembly 21 mounted from the motor shaft 64. This pulley assembly 21 will be described in detail later. Motor 20 is a single speed motor, and, in order to provide two different speeds of operation for agitator 14, the centrifugal pulley assembly 21 is used. Depending upon the selection by the operator, the centrifugal drive pulley assembly 21 is effective to drive a belt 25 at two different speeds.

The two speed centrifugal pulley assembly 21 is controlled by means of a speed selector solenoid 23. This solenoid operates a control mechanism 22 which is effective in one position to condition the two speed centrifugal pulley assembly 21 for the high speed drive of belt 25 and which, in the second position, is effective to condition the pulley assembly 21 for the low speed drive of belt 25.

The belt 25 transmits power to a transmission assembly 24 and driven pulley 26. Thus, depending upon the direction of motor shaft 64 rotation, pulley 26 and transmission 24 are driven in opposite directions. Transmission 24 is so arranged that it supports and drives both the agitator drive shaft and the basket mounting hub 19. When motor 20 is rotated in one direction the transmission causes agitator 14 to oscillate in a substantially horizontal plane within the basket 2 at the speed determined by centrifugal drive pulley assembly 21. Conversely, when the motor 20 is driven in the opposite direction the transmission rotates wash basket 2 and agitator 14 together at a centrifuging speed determined by centrifugal drive pulley assembly 21 for centrifugal liquid extraction. While the specific type of transmission system used does not form part of my invention, reference is made to U.S. Pat. No. 2,844,224 issued to James R. Hubbard et al on July 22, 1958 and owned by the General Electric Company, assignee of the present invention. That patent discloses in detail the structural characteristics of a transmission suitable for use in the illustrated machine.

In addition to operating transmission 24 as described, motor 20 also provides a direct drive through a flexible coupling 27 to a pump structure, generally indicated at 28, which may include two separate pump units 29 and 30, both operated simultaneously in the same direction by motor 20. Pump unit 29 has an inlet which is connected by a conduit 31 to an opening 32 formed at the lowermost point of tub 4. Pump unit 29 also has an outlet which is connected by conduit 33 to a suitable drain (not shown). Pump unit 30 has an inlet connected by a conduit 34 to the interior of tub 4 and outlet connected by a conduit 35 to a nozzle 36. The pumps are formed so that in the spin direction of motor rotation pump 29 will draw in liquid from opening 32 through conduit 31 and discharge it through conduit 33 to drain, and in the other direction of rotation pump 30 will draw in liquid through conduit 34 and discharge it through conduit 35 and nozzle 36, each of the pumps being substantially inoperative in the direction of rotation in which it is not used.

Nozzle 36 is positioned to discharge into a filter pan 37 secured on the top of agitator 14 so as to be movable therewith. With this structure then, when the motor is rotating so as to provide agitation, pump 30 draws liquid through conduit 34 from tub 4 and discharges it through conduit 35 so that the liquid passes from nozzle 36 into filter pan 37 and then down through a number of small openings (not shown) provided in the bottom 39 of filter pan and back into basket 2. In this manner, the filter pan 37 with its small openings and its upstanding side wall 40 causes lint which is separated from the clothes during a washing operation to be filtered out of the water and thus prevented from being redeposited on the clothes.

Motor 20, two speed centrifugal drive pulley assembly 21, transmission 24, basket 2 and agitator 14 form a suspended washing and centrifuging system which is supported by the stationary structure of the machine so as to permit isolation of vibrations from the stationary structure. It will be understood that such vibrations occur primarily as a result of high speed spinning of basket 2 with a load of clothes therein. While any suitable suspension structure may be used, one suitable structure includes a bracket member 41 with transmission 24 mounted on top thereof and motor 20 mounted to the underside thereof. The bracket member in turn is secured to upwardly extending rigid members 42 and each of the two upwardly extending members 42 is connected to a cable 43 supported from the top of the machine. While only a portion of the suspension system is shown it is fully described in U.S. Pat. No. 2,987,190 issued on June 6, 1961 to John Bochan and assigned to General Electric Company, assignee of the present invention.

In order to accommodate the movement which occurs between basket 2 and tub 4 without any danger of leakage between them the stationary tub 4 is joined to the upper part of transmission 24 by a flexible member 44. Member 44 may be of any suitable configuration, many of which are known in the art, to permit relative motion of the parts to which it is joined without leakage therebetween.

Hot and cold water may be supplied to the machine through conduits 45 and 46 which are adapted to be connected respectively to sources of hot and cold water (not shown). Conduits 45 and 46 are connected to a conventional mixing valve structure 47 having solenoids 48 and 49 so that energization of solenoid 48 permits passage of hot water through a valve to a hose 50, energization of solenoid 49 permits the passage of cold water through the valve, and energization of both solenoids permits mixing of hot and cold water in the valve and passage of warm water into hose 50. Hose 50 has an outlet 51 positioned to discharge into basket 2 so that when one or both of the solenoids 48 and 49 are energized, water passes into basket 2 and tub 4.

The level to which water rises in the basket and tub may be controlled by any suitable liquid level sensing means. One typical arrangement for doing this is to provide an opening 52 in the side of tub 4 adjacent the bottom thereof, opening 52 being connected through a conduit 53 and a tube 54 to a conventional pressure sensitive switch device 55 which may be positioned within the control panel 56 of machine 1. In the conventional manner, water rises in basket 2 and tub 4 and exerts increasing pressure on the column of air trapped in the tube 54, and at a predetermined pressure level the column of air then trips switch 55 to shut off whichever of solenoids 48 and 49 may be energized. The control panel 56 may have suitable manual controls, such as that shown at 57, extending therefrom so that the particular fabric cycle desired may be controlled to effect the washing of different types of fabrics.

With reference to the FIGS. 2–5 particularly, the two-speed centrifugal drive pulley assembly 21 will be described in detail. The belt 25 is driven by a V-grooved pulley including a first half pulley 58 secured to a drive member such as motor shaft extension 60 by a key element 62 or any other suitable securing means. The first half pulley 58 is rotatable in unison with the motor shaft extension 60 which in turn is connected to the motor shaft 64 of motor 20. The first half pulley 58 is not axially movable on the drive shaft extension 60. The second half pulley 66 is also secured to motor shaft extension 60 as by a key slot 68 such that the second half pulley 66 will rotate in unison with the drive shaft extension 60 and be axially movable on the drive shaft extension 60. Below the second half pulley 66 there is a base member 70 which is secured to the drive shaft extension 60 again as by key means or slot 68 but it is not axially movable relative to the drive shaft extension 60. Cavities 72 are provided between the second half pulley 66 and the base member 70 to receive therein flyweights 74. The inner surface of the cavities 72 and the outer surface of the flyweights 74 have complementary slopes, the flyweights slope converging toward each other in a direction radially outward of the drive shaft extension 60.

There is also provided below the base member 70 a collar 76 secured to the drive shaft extension 60 for rotation in unison therewith and axially movable relative to the drive shaft extension 60. The collar 76 is secured to the second half pulley 66 by several mounting pins 78 which pass through the oversize bores 80 in the base member 70 and are securely fastened to the second half pulley 66 as by threading means. By this arrangement then the second half pulley 66 and the collar 76 may be axially movable relative to the motor shaft extension 60 while the base member 70 remains in a fixed axial position relative to the motor shaft extension 60. A spring 82 surrounds the motor shaft extension 60 and has one end 84 bearing against the upper surface 85 of the collar 76 and the opposite end 86 of the spring bears against the lower surface 88 of base member 70.

The motor shaft extension 60 is secured to motor shaft 64 by a U bolt 90 in cooperation with a bar 92 between the legs of the U bolt 90 engaging a flat area 94 on the shaft and secured thereagainst by nuts 96.

Figure 2:
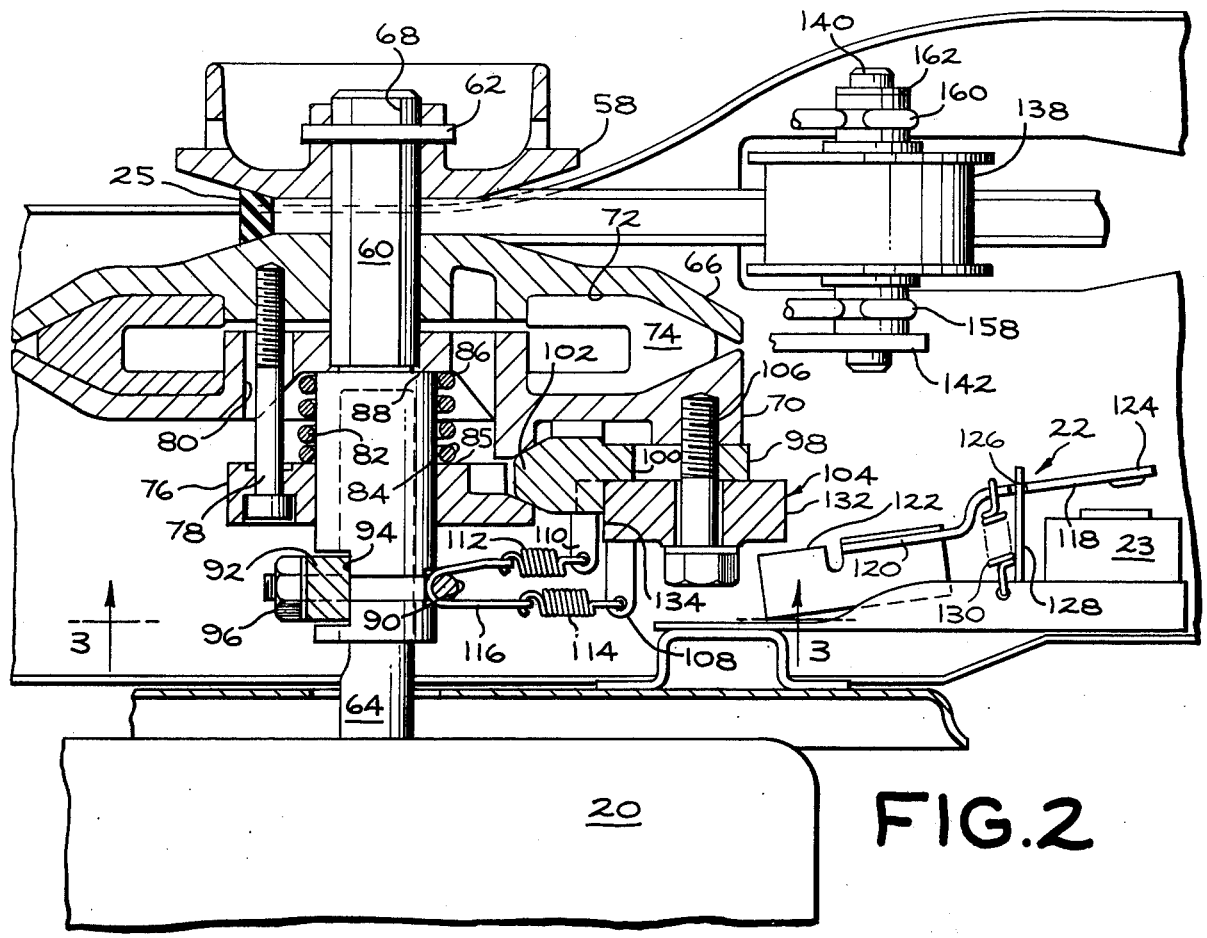
FIG. 2 is a fragmentary side elevational view showing my centrifugal drive pulley assembly in the slow belt driving mode, the mechanism being partly broken away partly in section to illustrate details.

In cooperation with the drive pulley assembly 21 there is a speed selection mechanism which includes an auxiliary weight 98 located at one side of the drive pulley assembly and radially outward of the motor shaft extension 60. The auxiliary weight 98 has a slot 100 therethrough and a nose 102 at one end thereof which, as shown in FIG. 2, engages the collar 76 and the base member 70. Below the auxiliary weight 98 is a trigger 104 with both the trigger 104 and auxiliary weight 98 being carried by the base member 70 by means of a mounting pin 106 secured to the base member 70 by thread means.

The trigger 104 is retained in its proper position by the mounting pin 106 such that it will pivot thereabout. The trigger 104 has a depending tang 108 and the auxiliary weight 98 has a depending tang 110, both of which have biasing means such as spring 112 for the auxiliary weight 98 and spring 114 for the trigger 104. Both springs 112 and 114 have their opposite ends connected to a U shaped member 116 which is secured around the U bolt 90. Springs 112 and 114 bias the auxiliary weight 98 and trigger 104 respectively in a radially inward direction relative to the motor shaft extension 60.

A control mechanism 22 is utilized and includes a lever element 118 which has at one end 120 a vertical arm 122. The opposite end 124 of the lever element 118 is positioned over the solenoid 23 so that when solenoid 23 is actuated end 124 will be pulled down into contact with the solenoid. The lever element 118 is centrally pivoted at point 126 by a pivot element 128. The end 120 of the lever element 118 is biased in a downward direction by a spring 130 so that end 124 will be out of contact with solenoid 24 when it is not actuated.

Figure 3:
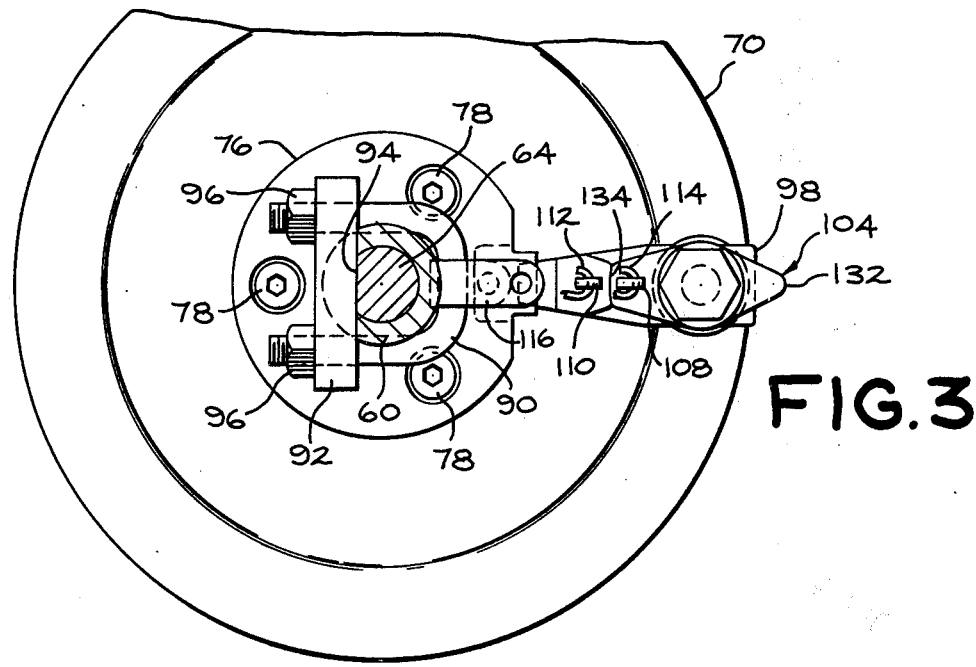
FIG. 3 is a plan view taken along lines 3—3 of FIG. 2.

The operation of the drive pulley assembly and speed selection mechanism will now be discussed. FIGS. 2 and 3 show the drive pulley assembly and speed selection mechanism in the slow speed wherein the belt speed is the slowest as it is driven by the smallest diameter formed between the first and second half pulleys. That is, the first half pulley 58 and the second half pulley 66 are spaced from each other so that the belt 25 will ride in the V groove close to the motor shaft extension 60. The flyweights 74 are prevented from moving the second half pulley 66 upwardly by centrifugal force because the second half pulley 66 is locked in its position, as shown in FIG. 2, in axial relationship to the motor shaft extension 60. This locking is accomplished by mounting pins 78 preventing axial movement of the second half pulley 66 by collar 76 being in turn locked against axial movement by the nose 102 of auxiliary weight 98 secured to base member 70. The auxiliary weight 98 is prevented from moving radially outward of the motor shaft extension 60 by centrifugal force since trigger 104 is blocking such movement.

Figure 4:
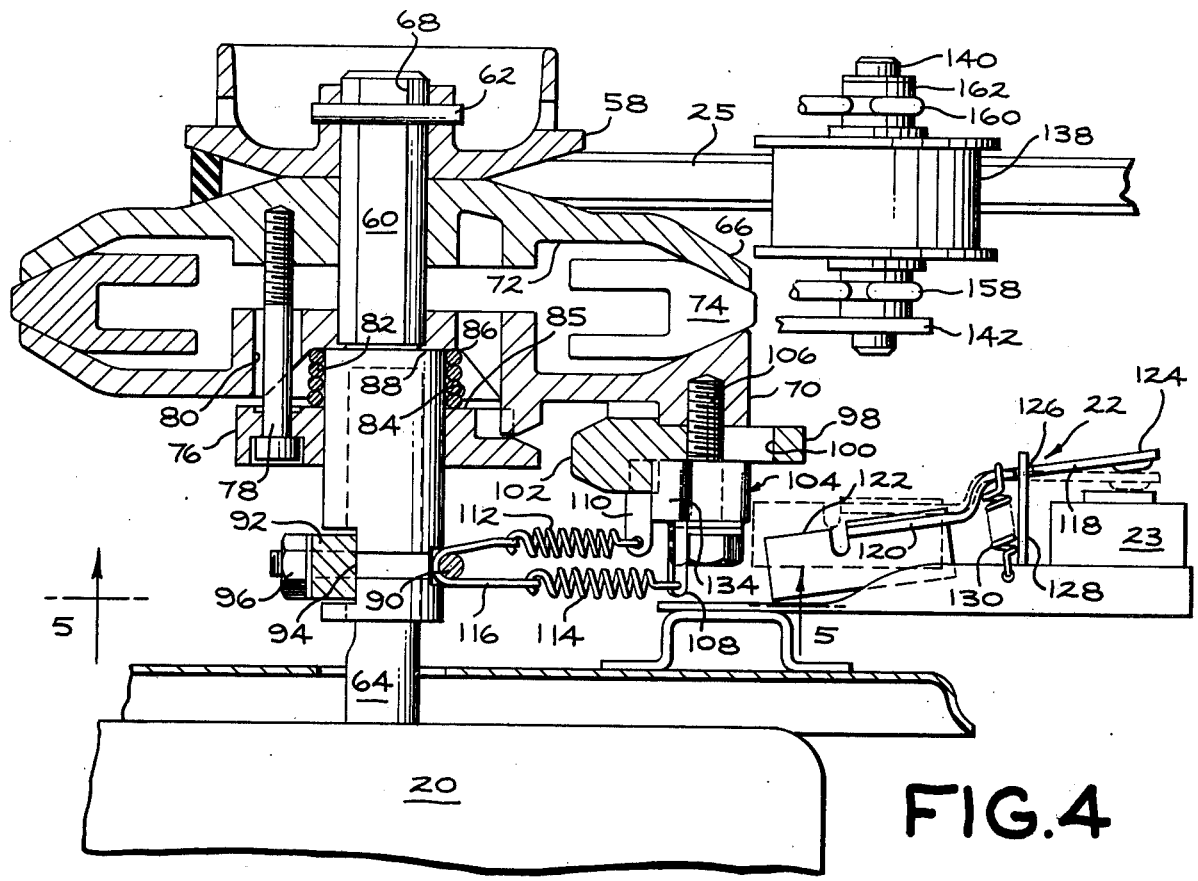
FIG. 4 is a fragmentary side elevational view of my centrifugal drive pulley assembly similar to FIG. 2 but showing the mechanism in the fast belt driving mode, the mechanism being partly broken away and partly in section to illustrate details.
Figure 5:
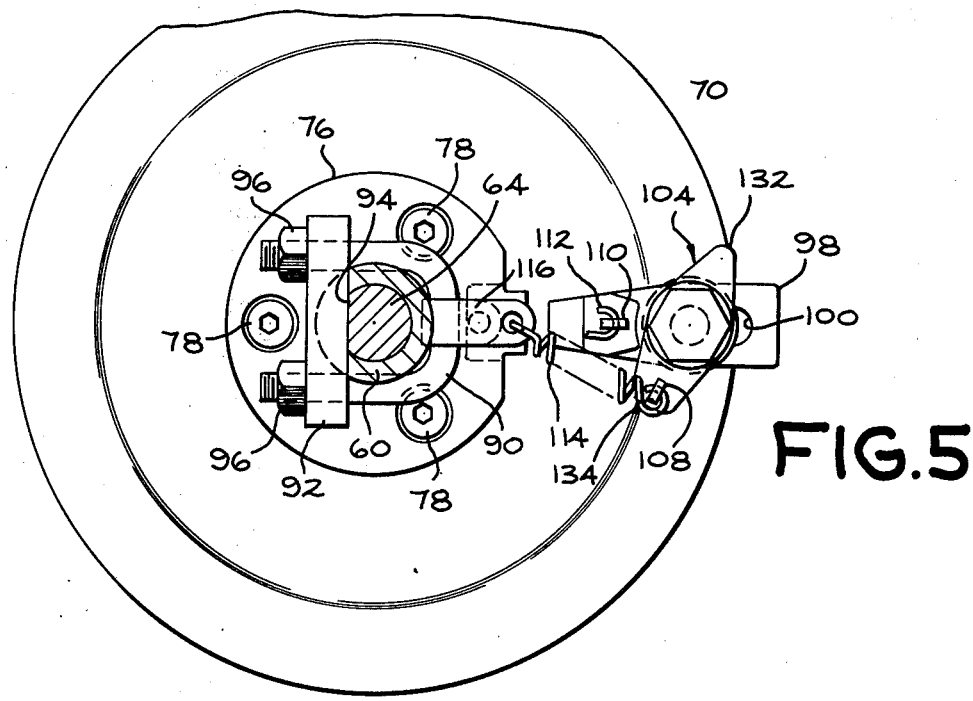
FIG. 5 is a plan view taken along lines 5—5 of FIG. 4.

With reference to FIGS. 4 and 5, the second or fast belt speed is accomplished by movement of the second half pulley 66 upwardly to abut the first half pulley 58 thus increasing the V groove diameter about which the belt 25 is driven. With the increased diameter and the same motor shaft speed the belt 25 will be accelerated accordingly. To obtain the fast speed the speed selection mechanism is actuated as follows. The electronic control system, such as in a clothes washing machine, will energize solenoid 23 at the proper preselected time in the operation of the machine thus drawing end 124 of lever element 118 downwardly overcoming the bias force of spring 130 so that end 120 carrying vertical arm 122 is raised to the position shown in FIG. 4. Upon vertical arm 122 being raised the path of rotating trigger 104 is interrupted and end 132 of trigger 104 hits the vertical arm 122 and in doing so is pivoted about mounting pin 106 to the position shown in FIG. 5. At that time the end 134 of trigger 104 is disengaged from the auxiliary weight 98 thus allowing the centrifugal force to move the auxiliary weight 98 radially outward which in turn removes the nose 102 thereof from engagement with the collar 76. With collar 76 now being free to move axially upward relative to the motor shaft extension 60 the flyweights 74 exert centrifugal force upon the second half pulley 66 causing it to be moved upwardly and in abutting contact with the first half pulley 58. The position of all of the aforementioned elements remains as such until the motor 20 is de-energized and the centrifugal force applied by the flyweights 74 and the auxiliary weight 98 are overcome by the respective springs 82, and 112. The trigger 104 is returned to its position radially outward of the motor shaft extension 60 by spring 114.

It should be noted in the mechanism arrangement described above that the cooperation between the fly weights 74 and both the second half pulley 66 and base 70 is such that if the motor speed is reduced, as by a motor overload or a low voltage condition, the spring 84 will overcome the below normal centrifugal force being applied by the fly weights 74 to the second half pulley 66 and base 70 and the diameter of the drive pulley will be reduced automatically, increasing the mechanical advantage between drive pulley and driven pulley, and reducing motor overload.

With reference particularly to FIG. 6 there is shown the driven pulley 26 which in turn operates the transmission 24. The input power transmission from the belt 25 is, as mentioned previously either a fast or slow speed depending upon the drive pulley assembly 21 and speed selection mechanism and its actuation by the controls of the clothes washing machine. As the pulley diameter driving the belt 25 is varied, the belt 25 will either slacken or be tightened and this must be compensated for to provide effective operation of the pulley drive system. For this an idler assembly 136 is utilized and includes a roller 138 that bears against the inner surface 139 of belt 25 and is free to rotate about pivot pin 140 retained on pivot arm 142. The opposite end of pivot arm 142 is pivoted for movement by a pin 144. Pivot pin 144 is retained in a fixed location by attachment to a rigid structural member 146. To place tension on the belt 25 by the roller 138 two springs 148 and 150, respectively, are appropriately secured at one end 154 and 156, respectively, to a fixed support structure 152 and at the opposite ends 158 and 160, respectively, to a roller bearing 162 about the pivot pin 140.

To achieve proper belt tension in a given mechanism the location and biasing force of springs 148 and 150 relative to the pivot pin 144 of pivot arm 142 and the length of pivot arm 142 determines the force applied to the belt 25. The force applied to the belt 25 determines the amount of slippage around the first half pulley 58 and the second half pulley 66 of the drive pulley assembly 21. As shown in FIG. 6, the belt 25 and idler assembly 136 in solid line is when the mechanism is in high speed spin and the dotted lines would be slow speed. The drive pulley assembly 21 would be rotating counterclockwise in both cases. If the torque between driven pulley 26 and the driving pulley assembly 21 rises above normal the belt 25 tends to assume a straight line tangent to both the driven and driving pulleys and roller 138 is moved opposite the spring bias force to provide belt slack and allow slight slippage of the belt which acts as a clutching means.

In the agitation mode of machine operation the motor 20 is reversed so the driving pulley assembly 21 would rotate clockwise as viewed in FIG. 6. In this mode it is desirable to have full torque force and only a small amount of roller 136 force against the belt is necessary to give sufficient belt tension to transmit high torque without belt slippage. It will be appreciated that other belt tensioning means may be used to accomplish the belt tensioning function.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

What is claimed is:

1. A two speed pulley drive system comprising:
(a) a drive member,
(b) a drive pulley assembly on said drive member having;
   (i) a first half pulley fixed on the drive member,
   (ii) a second half pulley rotatable with the drive member and axially movable on the drive member relative to the first half pulley,
   (iii) a collar mounted concentrically of and rotatable with the drive member, said collar having a bearing surface thereon and being axially movable relative to the drive member and secured to the second half pulley,
   (iv) a base member secured to the drive member and rotatable therewith,
   (v) a spring having one end bearing on the collar and the other end bearing on the base member,
   (vi) flyweights located between the second half pulley and the base member,
(c) a driven pulley assembly,
(d) a belt coactively connecting said pulley assemblies,
(e) a speed selection mechanism including,
   (i) a single auxiliary weight mounted on the base member for rotational movement therewith and movable from a radially inward position to a radially outward position relative to the drive member, said radially inward position engaging a bearing surface of the collar and the radially outward position disengaged from the collar bearing surface,
   (ii) a trigger mounted on the base member and rotatable therewith, said trigger being pivotal radially outward of the drive member from a first position in engagement with the auxiliary weight to a second position disengaging the auxiliary weight,
   (iii) a control member movable between first and second positions and means for so moving said control member, said control member in its first position being remote from the rotary path of said trigger, said control member in its second position being in the rotary path of said trigger only when said trigger is in its first position to pivot said trigger to its second position and thereby allow said auxiliary weight to be disengaged from the bearing surface of said collar.

2. The pulley drive system of claim 1 wherein there are means biasing said trigger and auxiliary weight to a radially inward position.

3. The pulley drive system of claim 1 wherein the control member is movable between first and second positions by a solenoid device.

4. The pulley drive system of claim 1 wherein the base member and collar are secured to the second half pulley by common mounting pins.

5. The pulley drive system of claim 1 wherein the auxiliary weight has an elongated slot therethrough, and a mounting pin secured to the base member passes through the slot.

6. The pulley drive system of claim 5 wherein the trigger pivot is the mounting pin with the auxiliary weight located between the trigger and base member.

* * * * *